Patented Mar. 15, 1938

2,111,248

UNITED STATES PATENT OFFICE 2,111,248

ABRASIVE BODY AND METHOD OF MAKING THE SAME

Emil E. Novotny, Philadelphia, Pa., assignor, by mesne assignments, to Stokes & Smith Co. (Durite Plastics Division), Philadelphia, Pa., a corporation of Pennsylvania No Drawing. Application September 4, 1929, Serial No. 390,426

3 Claims. (Cl. 51—280)

This invention relates to the manufacture of various articles of bonded granular abrasive material such as grinding wheels, discs, segments, blocks, etc. wherein a synthetic resin product of high purity and preferably free from solvents is utilized as a permanent bond for such abrasive granules and wherein an initially sticky, tacky adhesive substance which need not be a solvent for such synthetic resin is utilized as a temporary bond for the normally dry pulverized synthetic resinous products.

The chief object of my invention is to provide a product and method whereby abrasive granules may be coated with a temporarily sticky product sufficiently liquid at ordinary room temperatures to spread uniformly over the faces of such abrasive granules. A further object of my invention is to preferably introduce such sticky coating materials into the mixing device where such abrasive granules are to be coated as a preliminarily prepared sticky, tacky substance of known composition, viscosity, density, etc. and without depending upon the production of such sticky, tacky properties within the mixing device itself and without depending upon a solvent action of such coating body upon subsequently added ingredients.

By my method I am enabled to obtain a definite and consistent amount of adhesion to the abrasive granules and to the added dry granules of synthetic resin binder regardless of the melting point and solubility of such synthetic resin granules subsequently added. My method enables me to secure the desired amount of adhesion of the dry synthetic resin granules to the abrasive grains and a desired amount of wetting of such resin granules to maintain over a considerable period of time the desired degree of wetness or tackiness to enable the formation of the relatively dry, non-tacky mix into a desired shaped object when formed as by being pressed in a suitable mold.

In my copending application Serial No. 382,584, filed July 31, 1929, I have described a product and method whereby abrasive granules may be wetted with a sticky, balsamlike liquid or semisolid synthetic resin. This product and the method described therein are well suited for the purpose being disclosed herein.

For the sticky synthetic resin coating material I prefer to use condensation products of phenol or its homologues with aldehydes such as formaldehyde, its dehydration products or derivatives or furfural or other furane derivatives such as furfur alcohol, furfuramid, etc. Other synthetic resinous products are useful for my purpose, such as those made of a polybasic acid and a polyhydric alcohol or their equivalents or, for that matter, urea and thiourea resinous products.

For some purposes it is desirable to admix several resinous products as, for example, resins of the phenol type with resins of the glyptal type in order to secure a bond which will provide more tenacious adhesion to the abrasive granules without introducing smearing and marking of the product being ground with the abrasive material which is the present objection to the use of abrasive wheels bonded with resins of the glyptal type.

The thiourea resins and the vinyl resins are of particular interest inasmuch as products of high shock resistance and great deflection strength can be produced. Such products, however, do not stand high temperatures as well as resins of the phenol or of the glyptal type, and a reasonable amount of care must be exercised in the final heat treatment of the wheels if the entire bonding resinous body predominates in resins of the urea or thiourea type as such products decompose at lower temperatures.

The dry pulverized granular synthetic resin product which is subsequently added to the coated sticky mass of abrasive granules may likewise be a condensation product of similar resinous bodies as described for the relatively liquid sticky resinous product initially used for the coating. Admixtures of various resinous bodies may likewise be made in order to obtain the desired technical results. The addition of the dry granular resinous product is made in such quantities to serve the requirements of the type of abrasive wheel to be made, the type of abrasive granules to be bonded, and in a quantity sufficient to eliminate the stickiness of the preliminarily coated grains to an extent sufficient to permit the mix to assume a relatively dry consistency which may be readily broken up into small size particles either in the mixing device itself or by being passed through a screen of suitable dimensions. The body is purposely made free from excessive stickiness and tackiness in order that the same may be readily leveled in the molds to provide a product having a relatively uniform density and where abrasive wheels are made from such composition so that a uniform dynamic or running balance may be obtained.

As I preferably use wetting agents for the synthetic resin granules which are normally non-solvents for the dry resin granules subsequently introduced, such batches of mixed product may be kept on hand for a considerable length of time without becoming too dry for use in the molding and pressing operation. This is not true when a good solvent for the dry resin particles is used as a coating material for the abrasive granules and depends upon its solvent properties to dissolve a sufficient amount of resin from the dry resinous granules to impart the desired tacky, sticky consistency to the faces of the abrasive grains. Such solvent will quickly be dispersed and absorbed within the body of resinous material and will, after standing for a few hours, make such mixed mass difficult to press into shape and in many cases make such mass useless for the purpose.

By using a sticky coating material which is relatively a non-solvent for the dry resin, it has been found that abrasive wheels molded by my method may be kept on hand for a period of days and weeks prior to being introduced into the oven for final hardening treatment without loss in uniformity. On the other hand, resins temporarily bonded through the solvent action of an aldehyde such as furfural must be heat treated in the oven promptly; otherwise, such abrasive wheels will not have the desired uniformity when converted to their final and infusible form. This is particularly true of furfural and especially so where hexamethylene-tetramine is used as a hardening agent for a phenol resin inasmuch as the furfural tends to produce rubbery masses of a nondescript resinous nature which are weak in bonding powers and which may become infusible at the faces of the abrasive material so coated prior to the heat treatment in the oven, resulting in products un-uniform in strength and requiring special care and attention because of the use of a solvent aldehyde such as furfural.

As the heat treatment of abrasive wheels in an oven requires gradually increasing temperatures over a considerable period of time, which in some cases exceeds 54 hours and as the producer of such abrasive wheels has only a limited number of ovens available, usually but one, it is highly desirable that the molded products awaiting oven treatment undergo no chemical change after being formed and while being held for the final heat treating operation. My method of treatment, most particularly where a liquid synthetic resin product is utilized as the sticky coating material, is capable of maintaining its chemical characteristics over a long period of time, and for this reason products of great uniformity are being produced by my method in day in and day out commercial production.

The time of making up batches of abrasive material and organic bond is very materially reduced inasmuch as larger batches may readily be made and kept on hand for future use, thus eliminating the need for continually mixing small batches of organic bonded abrasive materials which greatly adds to the cost of producing such articles.

For the synthetic resin product used in coating the abrasive granules I may utilize any such product which is capable of adhering to the relatively dry abrasive granules. Care, however, should be exercised that the product is fusible and preferably of a proper consistency to uniformly coat such abrasive granules. I have found, however, that the use of a heavy body synthetic resin product requires an unusual amount of power to distribute such product uniformly over the abrasive granules and I therefore find it to be of utmost advantage to utilize a liquid synthetic resinous material having a Störmer viscosity of not over 1000 at 77° F. A watery thin product, i. e., a Störmer viscosity of 1 at the same temperature would be altogether too thin in body to satisfactorily stick the dry resinous material subsequently introduced and I, therefore, prefer to use a liquid synthetic resin product having a Störmer viscosity of at least 10 at the same temperature. From actual commercial production, I have determined that a phenol-formaldehyde liquid resin having an approximate viscosity of from 100 to 200 Störmer at 77° F. is most suitable for my purpose. This product is readily retained upon the abrasive granules and is sticky and tacky to a sufficient degree to hold the dry resinous powder in a substantially uniformly coated mass and is sufficiently liquid to provide the necessary adhesion during the forming of the object into the desired shape as when pressed in a suitable mold.

In using a liquid resin having a Störmer viscosity of 180 at 77° F., I have found that the proportion of liquid resin used for the coating to the proportion of dry resin granules subsequently added should be less than the weight of such dry granules. If the proportion of liquid resin by weight to the weight of dry resinous powder used is equal to or exceeds the weight of such dry resin, such mass will be altogether too sticky and tacky and it will be necessary to heat treat the mix at temperatures somewhat above normal such as at 180° F. for a period of from 15 minutes to 2 hours, depending upon the thickness of the layer being treated in order to polymerize the mass sufficiently so the composition may readily be broken up to the desired particle sizes to permit the ready leveling of the mass. Of course, where the liquid-like resinous product is of relatively high viscosity, say viscosity above Störmer 600, the proportion of liquid resin to dry resin may be equal and may even exceed the amount of dry resin used. This, however, involves an unnecessary expenditure for power in mixing. On the other hand, where a liquid resin having a Störmer viscosity of approximately 180 is used there is a definite minimum with respect to the quantity of abrasive granules used, their size, and the quantity of dry resin to be introduced. Commercial production has shown that such liquid resin should be used to the extent of at least .4% of the weight of abrasive granules used and at least 2% of the weight of dry resin to be added to such mix. The requirements, however, vary somewhat, depending upon the size of grain and the percentage of resin to be introduced, the following examples illustrating optimum conditions.

A mix intended for the soft center for 24" abrasive wheels comprising #16 silicon carbide abrasive grain would preferably consist of the following:

| | Weight | | Percent of total | Percent of abrasive |
|---|---|---|---|---|
| | Lb. | Oz. | | |
| #16 silicon carbide | 54 | 0 | 90.00 | |
| Phenol-formaldehyde liquid resin Störmer 180 at 77° F | 1 | 8 | 2.51 | 2.77 |
| Phenol-formaldehyde dry resin, pulverized | 4 | 8 | 7.49 | 8.33 |
| Totals | 60 | | 100.00 | 11.10 |

This mixture will be found to be suitable for working conditions at room temperature during the summer months. For winter months or where temperatures are sub-normal, the proportion of liquid resin should be increased and the proportion of dry resin correspondingly decreased.

Under similar conditions of operation for room temperatures during the summer months a mixture suitable for the production of standard 10" grinding wheels consisting of a mixture of silicon carbide granules approximately proportional by weight and consisting of #20, #24, #30 and #36, the following formula will be found most suitable:

|  | Weight | | Percent of total | Percent of abrasive |
|---|---|---|---|---|
|  | Lb. | Oz. | | |
| Silicon carbide mixture as above | 51 | 0 | 86.5 | |
| Liquid resin, viscosity 180 Störmer | 1 | 8 | 2.5 | 2.94 |
| Dry pulverized synthetic resin | 6 | 8 | 11.0 | 12.77 |
| Totals | 59 | | 100.0 | 15.71 |

At lower temperatures a larger percentage of liquid resin may be used with a proportionate decrease in the dry powdered resin. If a harder wheel is desired the proportion of both dry powdered resin and liquid resin should be increased.

An ideal mixture for the production of 12" diameter by 1/8" thick cutting off wheels for summer temperatures is as follows:

|  | Weight ounces | Percent of total | Percent of abrasive |
|---|---|---|---|
| Silicon carbide of varying sizes, the finest mesh being 60 | 168.0 | 84.00 | |
| Phenol-formaldehyde liquid resin 110 Störmer | 3.8 | 1.90 | 2.26 |
| Phenol-formaldehyde finely pulverized resin | 28.2 | 14.10 | 16.81 |
| Totals | 200.0 | 100.00 | 19.07 |

During conditions prevailing in the winter, an adjustment in the mass to the following figures has been found to be desirable. This is based upon room temperatures of approximately 60° F.

|  | Weight ounces | Percent of total | Percent of abrasive |
|---|---|---|---|
| Silicon carbide of varying sizes, finest 60 mesh | 168.0 | 84.00 | |
| Phenol-formaldehyde liquid resin Störmer viscosity 110 | 6.5 | 3.25 | 3.87 |
| Dry powdered resin consisting of equal parts phenol-formaldehyde and glycerine-phthalic anhydride type | 25.5 | 12.75 | 15.20 |
| Totals | 200.0 | 100.00 | 19.07 |

Under exceptional hot conditions of weather this same type of compound could advantageously work with a decreased amount of liquid resin, the balance of total resin remaining the same.

|  | Weight ounces | Percent of total | Percent of abrasive |
|---|---|---|---|
| Silicon carbide of similar grain sizes | 168.0 | 84.00 | |
| Phenol-formaldehyde liquid resin or a mixture of phenol-formaldehyde liquid resin and glycerine-phthalic anhydride liquid resin, Störmer viscosity 110 | 3.2 | 1.60 | 1.91 |
| Dry powdered resin as desired | 28.8 | 14.40 | 17.16 |
| Totals | 200.0 | 100.00 | 19.07 |

As the viscosity of the liquid resin is increased the proportion of liquid resin used may likewise be advantageously increased up to, say, somewhat less than the weight of the dry resin used. With the increase in the use of liquid resin for the same type wheel, the dry resin proportion is thereby reduced to maintain the percentage of total bonding material to the weight of abrasive granules as a more or less consistent percentage.

Although these examples are given for use in bonding silicon carbide abrasive granules, it is to be understood that other abrasive material may be used as, for example, aluminous oxide or various other synthetic abrasive products or, for that matter, natural abrasives such as flint, garnet, emery, etc. Where such abrasive materials are relatively more porous than the silicon carbide given by example, it is to be understood that the proportion of liquid resinous material used is to be increased sufficiently to provide the necessary tackiness to the entire mix to eliminate, as far as possible, loose, un-suspended synthetic resin particles and to provide a sufficient bond when the product is cold pressed in the dies.

The proportion of various sizes of abrasive grains and the admixture of various abrasives differ somewhat in the various plants where abrasive bodies are made, and, for this reason, no exact proportion of liquid coating material to the proportion of dry pulverized synthetic resin used or to the proportion of granules used can be given. The balancing of these proportions, however, is a very simple matter inasmuch as the abrasive grain and the dry pulverized resin should be wetted just sufficiently to bond such pulverized resin to the abrasive granules without having an undue amount of loose, dry powdery resinous material in the mass and, at the same time, have a mass which may readily be broken up into small lumps or particle sizes. This breaking up of the mass into small lumps or individual abrasive particles as by passing the mass through a relatively coarse sieve having a mesh of about 6 enables the uniform leveling of the composition in the mold, whereby the dynamic balance of the molded piece such as an abrasive wheel may be obtained with exactitude. The wetness of the mass, however, should not be so great as to produce a sticky molded article in the mold as such product is difficult to remove from the mold unless the mold be previously coated with a wax or with a paper facing. If the granules are too wet and therefore form sticky, tacky molded articles, the proportion of liquid resin or other liquid adhesive material should be reduced, or else provision should be made to cool the mold during the molding operation to sub-normal temperatures.

In the preceding examples I have shown that phenol-formaldehyde dry or liquid resins could be improved by mixing therewith resins of the glycerine-phthalic anhydride type for the purpose of securing in the case of the liquid resin used a better bond to the abrasive granules and in the case of both the liquid and pulverized resin a product of higher deflection and transverse strength and capable of withstanding higher temperatures in use.

The glycerine-phthalic anhydride type of resins as representative specifically of the polybasic acid-polyhydric alcohol type of resins produces very satisfactory products only that when used alone as the principal bonding ingredient the resinous mass tends to smear the work particularly where such abrasive is used for surfaces and for polishing.

Where such abrasive is used for cutting off wheel purposes this objection is not so serious.

By utilizing the straight liquid form of resin of this type as, say, the glycerine-phthalic anhydride liquid resin without admixture with phenol resins and applying such resin directly upon the faces of the abrasive grain, I am enabled to secure an exceptionally strong bond for the powdered synthetic resin subsequently added to the mix which may be any suitable synthetic resinous substance as, for example, phenol-formaldehyde or phenol-furfural condensation products. By utilizing the glyptal type of resin as a bond for the grain, it will be found that the glyptal resin wets the surface to better advantage than does the liquid phenol-formaldehyde resin. I am thus enabled to use two different types of resins, one for the immediate bonding or coating agent against the surface of the abrasive grain, and the other furnishing the bond for such coated surface. The phenol-formaldehyde resins bond to very good advantage with the glyptal type of resin and therefore a product of utmost strength and durability, having long wear qualities and capable of standing high temperatures is produced.

In the use of these other resins such as those of the glyptal type for the first bonding agent, the proportion of wet resinous material to abrasive grains and to the weight of the dry synthetic resin used may be about the same as given in the preceding examples and depends also upon the viscosity of such liquid resin and the room temperature prevailing when such mixing and pressing is done. The keeping qualities of these glyptal resins are also very good and the mass will therefore retain its required consistency for a considerable length of time.

In the production of liquid synthetic resins of the phenol-formaldehyde type it is preferable to utilize phenol crystals of U. S. P. grade although, of course, various cresols, xylenols or other higher phenolic bodies may be used either alone or in admixture with each other. It is, however, desirable to produce a product which will not boil and bubble unduly when being heat treated in order to convert the same into its ultimate infusible form. It is also highly desirable that such product should be low enough in viscosity so as to cover the abrasive granules without an undue expenditure for power in operating the mixing device. I find the following formula to be most suitable for my purpose:

| | Ounces |
|---|---|
| Phenol, U. S. P. | 32.00 |
| Formaldehyde, commercial | 35.00 |
| H₂O | 17.00 |
| NaOH, previously dissolved in water in the ratio of 1 part to 10 parts of water; solution used by weight | 1.28 |

The product is placed into a suitable kettle provided with a jacket for heating and for cooling and provided with a suitable stirring device. The mixture is boiled under a reflux condenser for a period preferably of 2 hours and 30 minutes. The mass is then cooled to room temperature and the watery layer on the top of the mass is discarded. The mass may now be allowed to settle to eliminate any further water which may be occluded therewith. A small amount of water mixed with the mass does not greatly interfere with the use of the product although the inclusion of a large amount of water with such resinous mass will produce abrasive bodies weak in tensile, transverse and deflection strengths.

I therefore find it preferable to eliminate water of solution where the liquid resin is to be used in the production of high grade, strong bodies. Preferably, therefore, I pass the liquid material through a high speed centrifuge whereby the water is further eliminated.

As it is preferable to keep the viscosity of the liquid resin as low as possible, it is not desirable to distill the water from the mass and most particularly not at atmospheric pressures, and it is, furthermore, not desirable to practice steam distillation for the same reason.

To produce a still purer product which will contribute to the ultimate strength of the abrasive objects, I prefer to wash the liquid resinous condensation product in several changes of water so as to eliminate free phenolic bodies should any remain therein.

This liquid resinous material is a one-stage phenol-formaldehyde condensation product wherein substantially all of the phenolic bodies have been combined with substantially all of the aldehyde. This product is potentially reactive and capable of assuming a hard, set and infusible form without undue bubbling, gassing, etc. which would be ruinous for the purpose inasmuch as such finely hardened abrasive bodies made with this material would either be weak in strength or would be badly blistered, warped, etc.

While I prefer to use a single stage potentially reactive synthetic resin, it is to be understood that for my purpose I may add to such single stage resin various modifying agents of a liquid, semi-liquid, or solid nature should it be considered desirable to impart flexibility or for various other technical advantages. For these addition products I may add a desired amount of diethyl or dibutyl phthalate, furfural, furfur alcohol, chlorinated napthalene, various waxes such as carnauba, Montan wax, etc. To the mass I may also add various aldehydes such as anhydrous formaldehyde, furfural, benzaldehyde or various aldehyde derivatives such as furfur alcohol, hexamethylenetetramine, furfuramid, etc. Other plasticizing materials such as China wood oil or various fatty acids can be introduced, and their introduction may be facilitated by dissolving such products first in suitable common solvents as, for example, furfural.

I have found, however, that for utmost strength where other qualities such as flexibility are not desired at the expense of utmost strength, that a liquid resin of high purity without the addition of other substances is to be preferred.

Where the adhesive body is of very heavy viscosity such as, for example, a high viscosity semi-liquid or solid synthetic resin, various waxes, etc., the abrasive grains may be heated to a suitable temperature as from say 180 to 200° F. and the coating adhesive may be added either hot or cold, whereupon it will be found that the mixing can be done readily, a good coating will be secured, and the cost of power operation for the mixing device will be reduced to a minimum.

While my preferred method contemplates the use of liquid adhesive products as completely formed adhesives added to the mix of abrasive granules or to a mix of abrasive granules and dry synthetic resin powder, it is to be understood that I may likewise first mix the dry synthetic resin powder with the adhesive liquid in order to thoroughly coat such resinous granules with the adhesive and subsequently add this mass to the proper weight of abrasive granules to be treated, whereupon such coated resinous grains will be caused to adhere or be suspended upon the abrasive granules. Where a limited number of abrasive wheels are to be made of one grain size of abrasive granule, this method offers some advantage over the other inasmuch as the dry resinous powder may be preliminarily mixed with the adhesive wetting agent which is preferably a nonsolvent for such resin and this compound may be kept on hand in ready-to-use form for subsequent mixing with a small batch of particular abrasive grains required.

It is to be understood that I do not limit myself to the precise details of operation or proportion in my composition or methods inasmuch as wide departures and variations may be made without departing from the spirit of the invention or the scope of the appended claims.

What I claim is—

1. The method of making abrasive articles consisting of comingling a dry pulverized fusible potentially reactive resin with a mass of abrasive granules previously coated with a sticky tacky resinous liquid that does not dissolve said fusible resin at ordinary room temperatures, cold molding the mixture thus obtained to form an article of predetermined dimensions, and subjecting the molded piece to heat to convert said liquid and said dry resin into a unitary bond for the mass.

2. The method of making abrasive articles consisting of comingling a dry pulverized fusible potentially reactive phenol-aldehyde resin with a mass of abrasive granules previously coated with a liquid reactive synthetic resin that does not dissolve said fusible resin at ordinary temperatures, and said liquid resin having a Störmer specific viscosity of from 100 to 200, cold molding the mixture and subjecting it to heat to convert the liquid and dry resin to their final infusible form.

3. A composition for making abrasive articles comprising abrasive grains, a powdered solid fusible potentially reactive synthetic resin and a liquid synthetic resin coated on the abrasive grains and suspending the solid powdered resin, the liquid resin having substantially no solvent action on the said solid resin at ordinary temperatures, the ingredients being in such proportions as to give a dry pourable mix which remains dry at ordinary temperatures over a relatively long period of time by virtue of the fact that the solid resin does not readily dissolve in the liquid resin to produce a sticky mass.

EMIL E. NOVOTNY.